(12) United States Patent
Cuppett et al.

(10) Patent No.: US 8,963,027 B2
(45) Date of Patent: Feb. 24, 2015

(54) GUIDE STRUCTURE FOR RAISING CONTROL CABINET OF A HIGH VOLTAGE DEAD TANK CIRCUIT BREAKER TO A SHIPPING POSITION

(71) Applicant: ABB Technology AG, Zurich (CH)

(72) Inventors: Matthew Cuppett, Uniontown, PA (US); Jonathan Fuge, Farmington, PA (US); Beth Dahm, Pittsburgh, PA (US)

(73) Assignee: ABB Technology AG, Zürich (CH)

( * ) Notice: Subject to any disclaimer, the term of this patent is extended or adjusted under 35 U.S.C. 154(b) by 161 days.

(21) Appl. No.: 13/851,132

(22) Filed: Mar. 27, 2013

(65) Prior Publication Data

US 2013/0270088 A1 Oct. 17, 2013

Related U.S. Application Data

(60) Provisional application No. 61/623,597, filed on Apr. 13, 2012.

(51) Int. Cl.
| | | |
|---|---|---|
| *H01H 31/02* | (2006.01) | |
| *H01H 9/02* | (2006.01) | |
| *H01H 33/02* | (2006.01) | |
| *H02B 3/00* | (2006.01) | |
| *H02B 5/06* | (2006.01) | |

(52) U.S. Cl.
CPC ............. *H01H 9/0207* (2013.01); *H01H 33/02* (2013.01); *H02B 3/00* (2013.01); *H02B 5/06* (2013.01)
USPC ........................................................ 200/48 R

(58) Field of Classification Search
CPC .......... H01H 33/02; H01H 9/0207; H02B 3/00
USPC ............... 200/48 R; 218/134, 139, 44, 78, 84
See application file for complete search history.

(56) References Cited

U.S. PATENT DOCUMENTS

| | | | | |
|---|---|---|---|---|
| 3,662,128 | A * | 5/1972 | Neudorfer et al. | 200/48 R |
| 4,752,859 | A * | 6/1988 | Chabala et al. | 361/602 |
| 5,128,502 | A * | 7/1992 | Hux | 218/153 |
| 7,915,558 | B2 * | 3/2011 | Nelson et al. | 218/155 |
| 8,071,905 | B2 * | 12/2011 | Yoshitomo et al. | 218/155 |

(Continued)

FOREIGN PATENT DOCUMENTS

DE 9411012 U1 8/1994

OTHER PUBLICATIONS

PCT Search Report & Written Opinion in PCT/US2013/033956 dated Jun. 28, 2013.

*Primary Examiner* — Kyung Lee
(74) *Attorney, Agent, or Firm* — Manelli Selter PLLC; Edward J. Stemberger

(57) ABSTRACT

A pole and actuating assembly for a circuit breaker includes a support frame, a plurality of pole and actuating members carried on the support frame, cabinet movably coupled with respect to the support frame, and guide structure between the support frame and the cabinet. The guide structure is constructed and arranged to permit guided, generally vertical movement of the cabinet with respect to the support frame so that the cabinet can be moved between an installation position wherein a bottom surface of the cabinet is on a plane different from a plane of the support frame, and a travel position wherein the bottom surface of the cabinet is on generally the same plane as the support frame.

15 Claims, 4 Drawing Sheets

(56) References Cited

U.S. PATENT DOCUMENTS 8,440,913 B2 * 5/2013 Stull et al. ............ 174/161 R
2008/0257865 A1 * 10/2008 Yoshitomo et al. ............ 218/68
2009/0045892 A1 * 2/2009 Nelson et al. ............ 335/202
2013/0270088 A1 * 10/2013 Cuppett et al. ............ 200/48 R

* cited by examiner

GUIDE STRUCTURE FOR RAISING CONTROL CABINET OF A HIGH VOLTAGE DEAD TANK CIRCUIT BREAKER TO A SHIPPING POSITION

FIELD

The invention relates to high voltage dead tank circuit breakers and, more particularly, to guide structure for raising a control cabinet to a shipping position while maintaining connections with the breaker pole assemblies.

BACKGROUND

Circuit breakers are commonly found in substations and are operable to selectively open and close electrical connections. With reference to FIG. 1, a conventional circuit breaker is shown, generally indicated at 10. Circuit breaker 10 is a three phase circuit breaker, and thus includes three pole assemblies 12a, 12b and 12c. Each pole assembly includes a first electrical conductor 14 carried in a first bushing 16 and a second electrical conductor (not seen) carried in a second bushing. As is known in the art, electrical power lines are coupled to first and second electrical conductors, and the circuit breaker 10 selectively opens or closes the electrical connection therebetween. A bell crank 20a, 20b, 20c, is associated with a respective pole assembly 12a, 12b and 12c. The bell cranks are interconnected by a gang-style linkage structure 22 including interconnecting shafts 23 so that all three poles assemblies are actuated at the same time by a single operating mechanism, generally indicated at 24, housed within a control cabinet 25.

With the conventional circuit breaker 10, the cabinet 25 sits below the pole assemblies 12a, 12b and 12c. This allows easy access for servicing. However, this cabinet position increases the shipping height. Thus, in preparing the conventional circuit breaker 10 for shipping, the operating mechanism, together with the control cabinet 25, is required to be disconnected from the pole assemblies 12a, 12b and 12c and certain wiring must be disconnected. This increases cost of shipping due to disassembly and reassembly time required.

Thus, there is a need to provide guide structure to enable a control cabinet, which is separate from the operating mechanism, to be moved to a shipping position without the need to disconnect any wire connections.

SUMMARY

An object of the invention is to fulfill the need referred to above. In accordance with the principles of the present invention, this objective is obtained by providing a pole and actuating assembly for a circuit breaker that includes a support frame, a plurality of pole and actuating members carried on the support frame, cabinet movably coupled with respect to the support frame, and guide structure between the support frame and the cabinet. The guide structure is constructed and arranged to permit guided, generally vertical movement of the cabinet with respect to the support frame so that the cabinet can be moved between an installation position wherein a bottom surface of the cabinet is on a plane different from a plane of the support frame, and a travel position wherein the bottom surface of the cabinet is on generally the same plane as the support frame.

In accordance with another aspect of the disclosed embodiment, a method is provided for moving a control cabinet of circuit breaker between an installation position and a travel position. The method provides a pole and actuating assembly including a support frame, a plurality of pole and actuating members carried on the support frame, a cabinet movably coupled with respect to the support frame, and guide structure between the support frame and the cabinet. The cabinet is moved generally vertically in one direction and guided by the guide structure so that a bottom surface of the cabinet is on a plane that is generally the same as a plane of the support frame defining a travel position of the cabinet. At an installation location, the cabinet is moved generally vertically in a direction opposite the one direction and guided by the guide structure so that the bottom surface of the cabinet is on a plane different from the plane of the support frame defining an installation position of the cabinet.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

The circuit breaker 10' described herein can be of the type disclosed in U.S. Patent Publication No. 2010/0270136 A1, published on Oct. 28, 2010, the content of which is hereby incorporated by reference into this specification.

Figure 1:
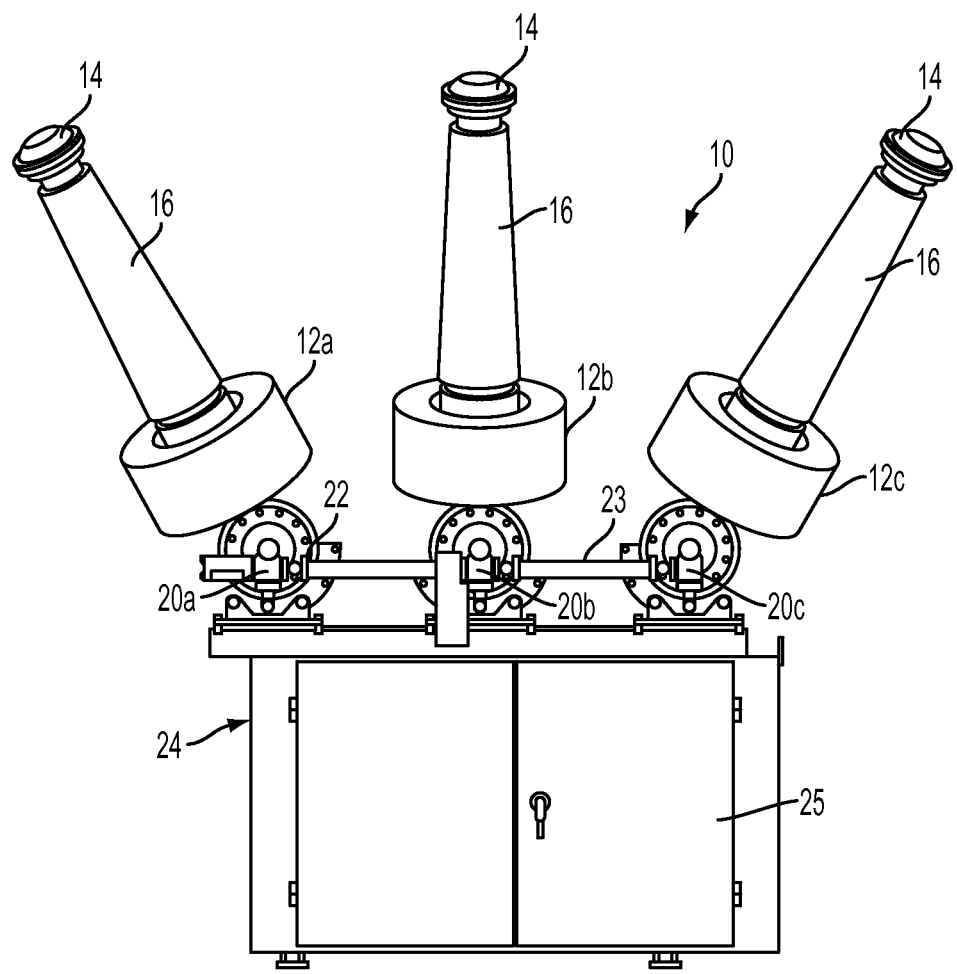
FIG. 1 is a side view of a conventional high voltage circuit breaker with attached control cabinet.
Figure 2:
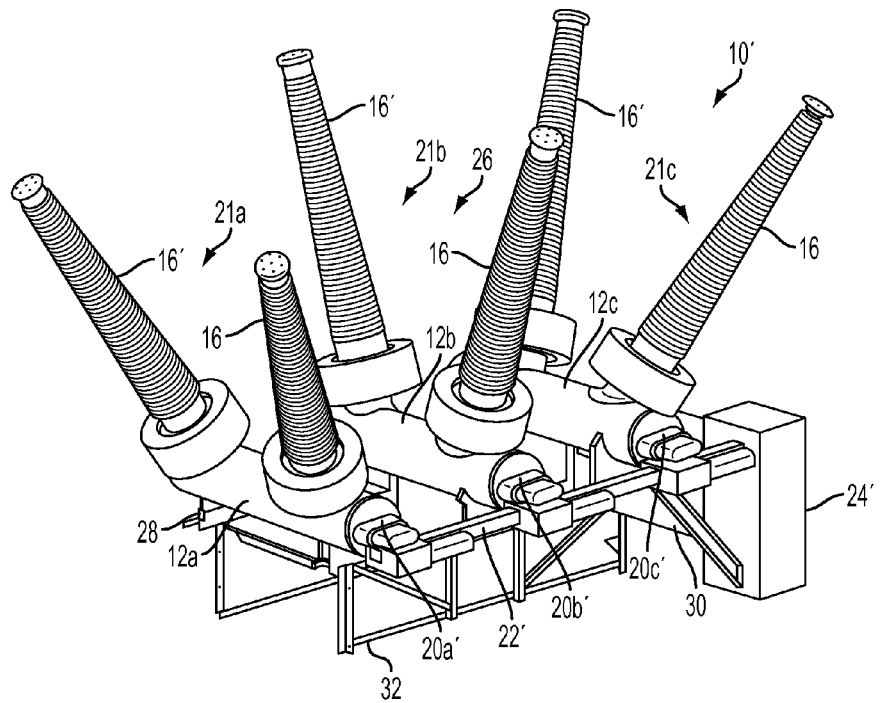
FIG. 2 is side view of a high voltage dead tank circuit breaker, in accordance with an embodiment, shown in an installation position.

With reference to FIG. 2, a high voltage, dead tank circuit breaker 10' is shown in accordance with an embodiment. The circuit breaker 10' includes a pole and actuating assembly, generally indicated at 26, that includes the three pole assemblies 12a, 12b, 12c, each having a pair of bushings 16, 16', and an actuator, preferably in the form of a bell crank 20a', 20b', 20c', coupled with a respective pole assembly 12a, 12b, 12c. Each pole assembly and coupled bell crank defines a pole and actuating member 21a, 21b, 21c, respectively. The assembly 26 includes the linkage structure 22' coupling the bell cranks so as to actuate the bell cranks generally simultaneously when operated by the operating mechanism 24' coupled with the linkage structure 22'. The assembly 26 also includes a support frame 28 carrying the pole and actuating members, and a control cabinet 30, separate from the operating mechanism 24', movably coupled with respect to the support frame 28. A mounting structure 32 supports the assembly 26 in the installation position.

Figure 3:
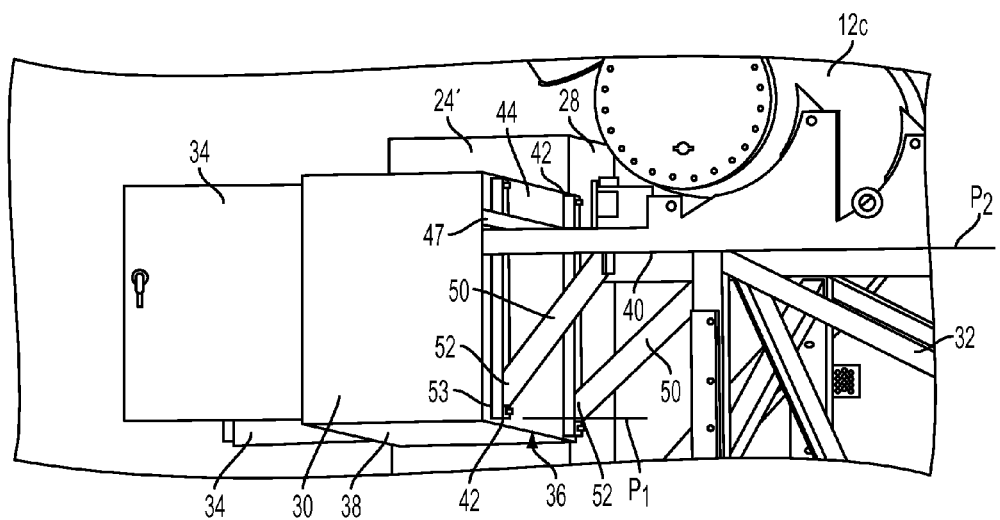
FIG. 3 is a view of the control cabinet of the circuit breaker of FIG. 2, shown with its doors open and with the control cabinet in the installation position.

With reference to FIG. 3, the control cabinet 30 is shown with its doors open in the installation position. In the conventional manner, the cabinet 30 houses electrical components and wiring for the circuit breaker 10'. Guide structure, generally indicated at 36, is provided between the support frame 30 and the cabinet 30 to permit guided, vertical movement of the cabinet 30 with respect to the support frame 28, as explained more fully below.

Figure 6:
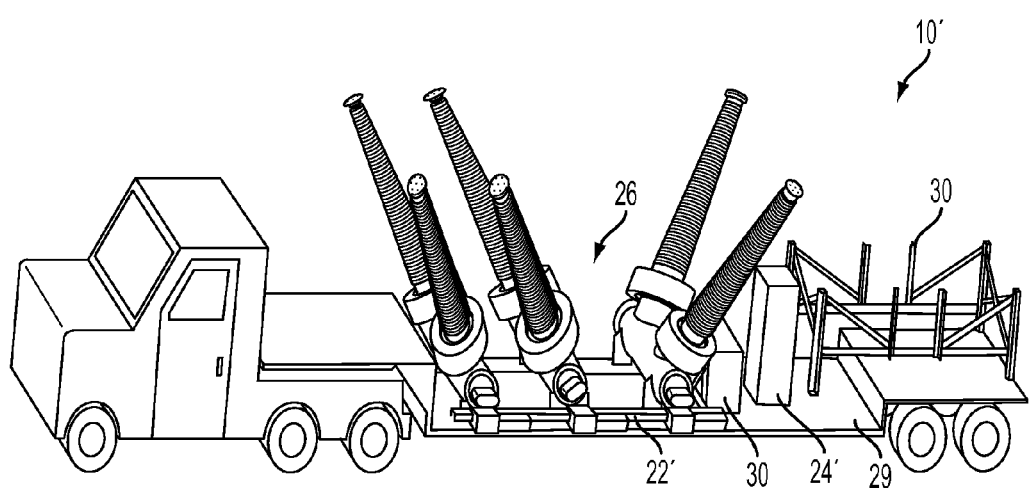
FIG. 6 is a view of the circuit breaker disassembled and mounted on a double drop trailer with the control cabinet in the travel position.

With reference to FIG. 6, to ship the circuit breaker 10' on a trailer 29, the operating mechanism 24' is disconnected from the linkage structure 22' and the assembly 26 is removed from mounting structure 32. Returning to FIG. 3, the cabinet 30 remains coupled to the support frame 28 of the assembly 26 and a bottom surface 38 of the cabinet 30 is disposed on a plane $P_1$ that is lower than plane $P_2$ of the support frame 28. Thus, since the bottom 36 of the cabinet 30 would rest on the trailer 29, the overall height of the assembly would be too high for safe shipping. Thus, in accordance with the embodiment, the guide structure 36 is provided for permitting movement of the cabinet so that the bottom surface 38 thereof is substantially on the same plane $P_2$ as the support frame 28.

Figure 4:
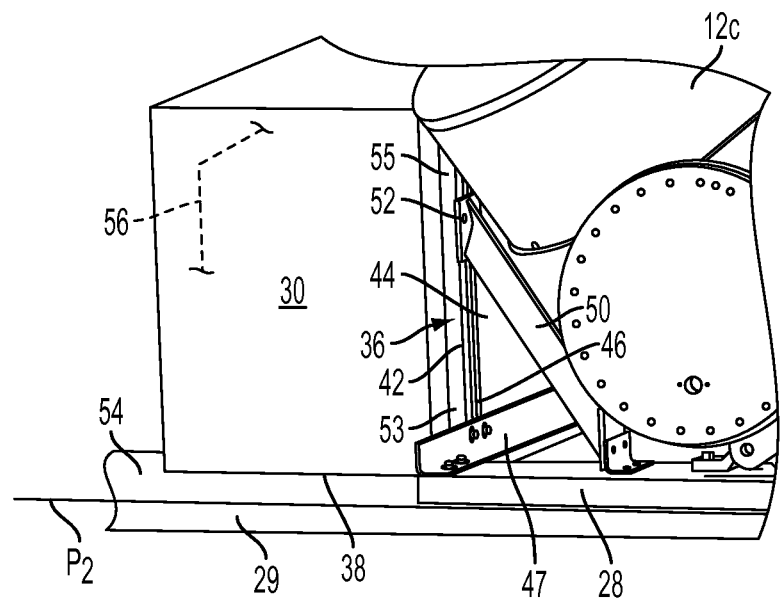
FIG. 4 is a view of the control cabinet of the circuit breaker of FIG. 2, shown mounted on a vehicle with the control cabinet in a travel position.
Figure 5:
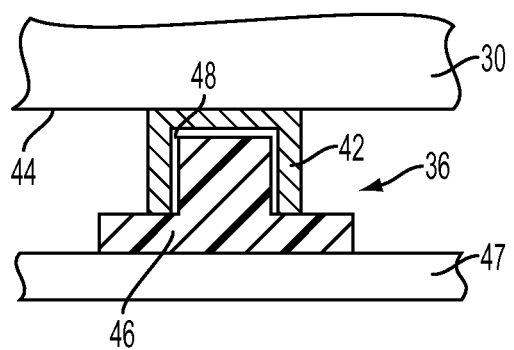
FIG. 5 is a top sectional view of a guide member in an associated guide rail of the guide structure of an embodiment.

With reference to FIGS. 3-5, the guide structure 36 includes at least one guide rail 42 fixed with respect to a sidewall 44 of the cabinet 30. In the embodiment, two f guide rails 42 are provided in spaced relation, with each guide rail 42 coupled to the sidewall 44. A guide member 46 is received within an inner channel 48 (FIG. 5) of an associated guide rail 42 so that the guide rail 42 can slide with respect to the guide member 46. Each guide member 46 is fixed to a cross bracket 47 that is fixed to the support frame 28. The bracket 47 can be considered to be part of the support frame 28. With reference to FIG. 5, each guide member 46 is preferably T-shaped member of a low coefficient friction material such as Duravar® that is captured in the inner channel 48 of an associated, generally U-shaped guide rail 42. The guide rails 42 are preferably metal such as stainless steel or aluminum.

With reference to FIG. 3, in the installation position, at least one support bracket 50 is coupled between a guide rail 42 and the support frame 28 for securing the cabinet 30. In the embodiment, a pair of support brackets 50 is provided. Prior to shipping, ends 52 of the support brackets 50 are disconnected from end portions 53 of the guide rails 42. To raise the cabinet 30 to the shipping position, a lifting device (not shown) engages the cabinet 30 and the cabinet is lifted vertically. As the guide rails 42 slide with respect to the guide members 46, the guide members 46 inside the rails 42 permit substantially only vertical movement of the cabinet and thus prevent rotation and sideways translation of the cabinet 30. The guide members 46 do not support the cabinet 30 during its movement, but only act as a guide. Once the bottom surface 38 of the cabinet 30 is substantially on plane $P_2$, ends 52 of the support brackets 50 are attached to the guide rails 42 at end portions 55 (opposite end portions 53 thereof) to secure the cabinet 30 in the travel position (FIG. 4). The assembly 26 can then be placed on a surface 54 of the trailer 29 for shipping (FIG. 6). As shown in FIG. 4, support frame 28 and the bottom surface 38 of the cabinet 30 rest on surface 54 that defines plane $P_2$.

Once at the installation location, the assembly 26 can be mounted on the mounting structure 32 and the ends 52 of the support brackets 50 can again be removed. The cabinet 30 can then be lowered to the installation position (FIG. 3) and the ends 52 of the support brackets 50 can be attached to the end portions 53 of the guide rails 42. The operating mechanism can then be coupled to the linkage structure 22'. Thus, the cabinet 30 can be raised or lowered without damaging the cabinet and the wires 56 therein, and without causing injury to an operator. Since all control wire connections are maintained, installation time is reduced.

It can be appreciated that in another embodiment, the guide members 46 can be fixed to the cabinet 30 and the guide rails 42 can be fixed to the bracket 47, and instead of fixing the ends 52 of the support brackets 50 to the guide rails 42, the ends 52 can be fixed directly to the cabinet 30.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A pole and actuating assembly for a circuit breaker, the assembly comprising:
   a support frame,
   a plurality of pole and actuating members carried on the support frame,
   a cabinet movably coupled with respect to the support frame, the cabinet having a bottom surface, and
   guide structure between the support frame and the cabinet constructed and arranged to permit guided, generally vertical movement of the cabinet with respect to the support frame while the cabinet remains coupled to the support frame so that the cabinet can be moved between an installation position wherein the bottom surface of the cabinet is on a plane different from a plane of the support frame and a travel position wherein the bottom surface of the cabinet is on generally the same plane as the support frame.

2. The assembly of claim 1, wherein the guide structure includes at least one guide rail and a guide member received within a channel of the guide rail.

3. The assembly of claim 2, wherein the guide member is generally T-shaped and the guide rail is generally U-shaped.

4. The assembly of claim 2, wherein the at least one guide rail is fixed to a sidewall of the cabinet and the guide member is fixed with respect to the support frame such that the guide rail slides with respect to the guide member with the guide member being constructed and arranged to permit substantially only vertical movement of the cabinet when moved between the installation and travel positions.

5. The assembly of claim 4, wherein two guide rails are mounted in spaced relation to the sidewall of the cabinet, with a guide member received in an associated guide rail.

6. The assembly of claim 1, wherein the cabinet houses control wires for the circuit breaker, the cabinet and control wires being constructed and arranged so that connection of the control wires are maintained during movement of the cabinet between the installation and travel positions.

7. The assembly of claim 1, further comprising at least one support bracket having a first end removably coupled to the guide rail and a second end fixed to the support frame such that when the cabinet is in the installation position, the first end is coupled to one end portion of the guide rail and in the travel position, the first end is coupled to an end portion of the guide rail opposite the one end portion thereof.

8. The assembly of claim 1, wherein three pole and actuating members are carried by the support frame.

9. The assembly of claim 1, in combination with mounting structure constructed and arranged to support the pole and actuating assembly in the installation position, and an operating mechanism, separate from the cabinet, for controlling operation of the pole and actuating members.

10. A method of moving a control cabinet of circuit breaker between an installation position and a travel position, the method comprising the step of:

providing a pole and actuating assembly including a support frame, a plurality of pole and actuating members carried on the support frame, a cabinet movably coupled with respect to the support frame, the cabinet having a bottom surface, and guide structure between the support frame and the cabinet, moving the cabinet, while the cabinet remains coupled to the support frame, generally vertically in one direction and guided by the guide structure so that the bottom surface of the cabinet is on a plane that is generally the same as a plane of the support frame, defining a travel position of the cabinet, and at an installation location, moving the cabinet, while the cabinet remains coupled to the support frame, generally vertically in a direction opposite the one direction and guided by the guide structure so that the bottom surface of the cabinet is on a plane different from the plane of the support frame, defining an installation position of the cabinet.

11. The method of claim 10, wherein the step of providing the guide structure provides at least one guide rail and a guide member received within a channel of the guide rail.

12. The method of claim 11, wherein the at least one guide rail is fixed to a sidewall of the cabinet and the guide member is fixed with respect to the support frame such that the guide rail slides with respect to the guide member with the guide member permitting substantially only vertical movement of the cabinet when moved between the installation and travel positions.

13. The method of claim 10, further comprising:

securing the cabinet to the support frame in each of the travel and installation positions.

14. The method of claim 13, wherein the securing step provides a bracket connected between the guide rail and the support frame.

15. The method of claim 10, wherein in the installation position of the cabinet, the method further comprises the steps of:

mounting the pole and actuating assembly to a mounting structure, and coupling an operating mechanism, separate from the cabinet, to the pole and actuating assembly.

* * * * *